United States Patent [19]

Desmond

[11] 4,143,730
[45] Mar. 13, 1979

[54] AUXILIARY UNIT FOR DRIVING A BICYCLE

[76] Inventor: Albert D. Desmond, 1730 W. Galena, Apt. 203E, Aurora, Ill. 60506

[21] Appl. No.: 898,155

[22] Filed: Apr. 20, 1978

[51] Int. Cl.² .......................................... B62M 11/08
[52] U.S. Cl. ................................ 180/33 D; 180/74
[58] Field of Search ............... 180/33 R, 33 C, 33 D, 180/74, 65 A; 74/207, 209

[56] References Cited

U.S. PATENT DOCUMENTS

| | | | |
|---|---|---|---|
| 1,764,851 | 6/1930 | Palm | 180/74 X |
| 2,409,887 | 10/1946 | Murphy | 180/74 X |
| 2,578,886 | 12/1951 | Isherwood | 180/74 X |
| 2,751,028 | 6/1956 | Laughlin | 180/74 X |
| 3,891,044 | 6/1975 | Tiede | 180/31 |
| 3,905,442 | 9/1975 | O'Neill, Jr. | 180/33 D |

Primary Examiner—Joseph F. Peters, Jr.
Assistant Examiner—Terrance L. Siemens
Attorney, Agent, or Firm—Darbo & Vandenburgh

[57] ABSTRACT

An electrically operated auxiliary unit for driving a bicycle constructed to be attached to the bicycle frame and, by means of driving engagement created by the weight of the drive motor along a lever arm, propel the bicycle with a drive pulley. The unit includes a motor support frame including a horizontal bar located at one side at the top of the rear wheel of the bicycle and which is attached to the bicycle frame. A horizontal arm, pivotally mounted on the horizontal bar, extends tranversely over the rear wheel. A motor is mounted upon the horizontal arm with the center of gravity of the motor located on the opposite side of the wheel from the location of the horizontal bar. The horizontal arm acts as the lever arm, and driving engagement is created between the drive pulley and the wheel of the cycle by the weight of the motor.

10 Claims, 3 Drawing Figures

U.S. Patent  Mar. 13, 1979  4,143,730
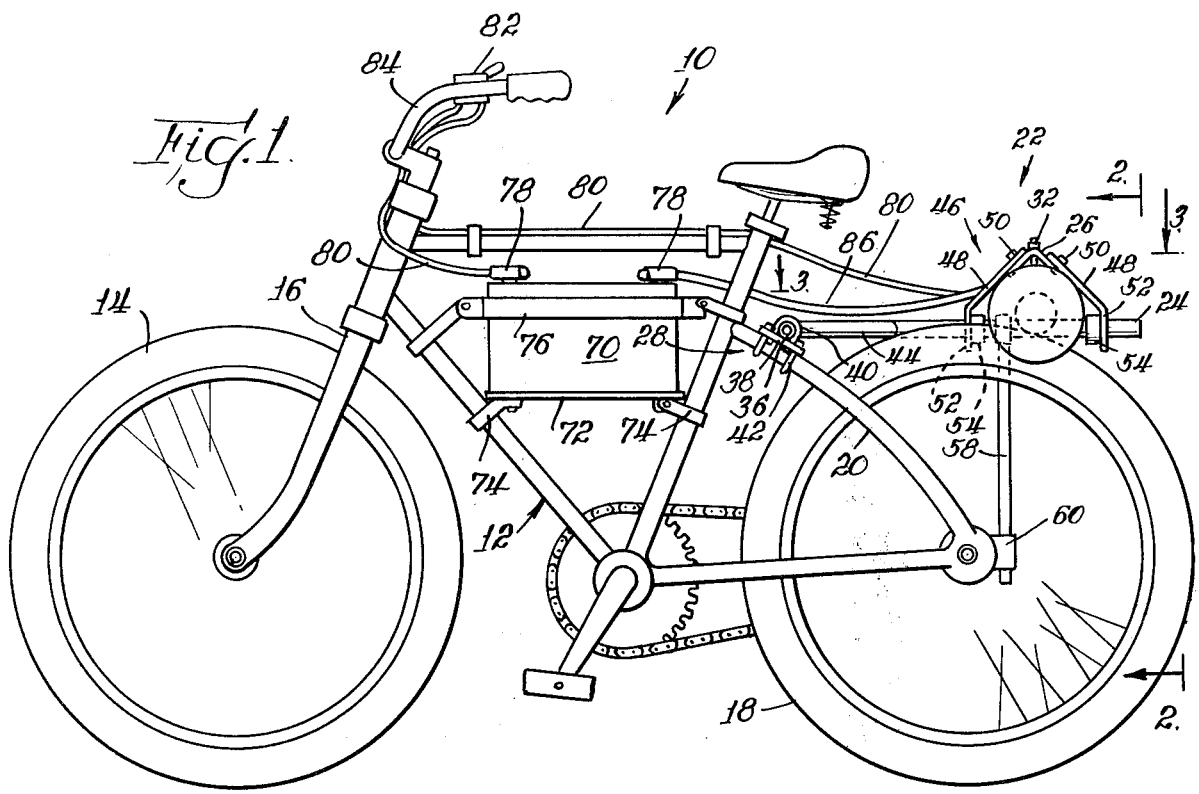
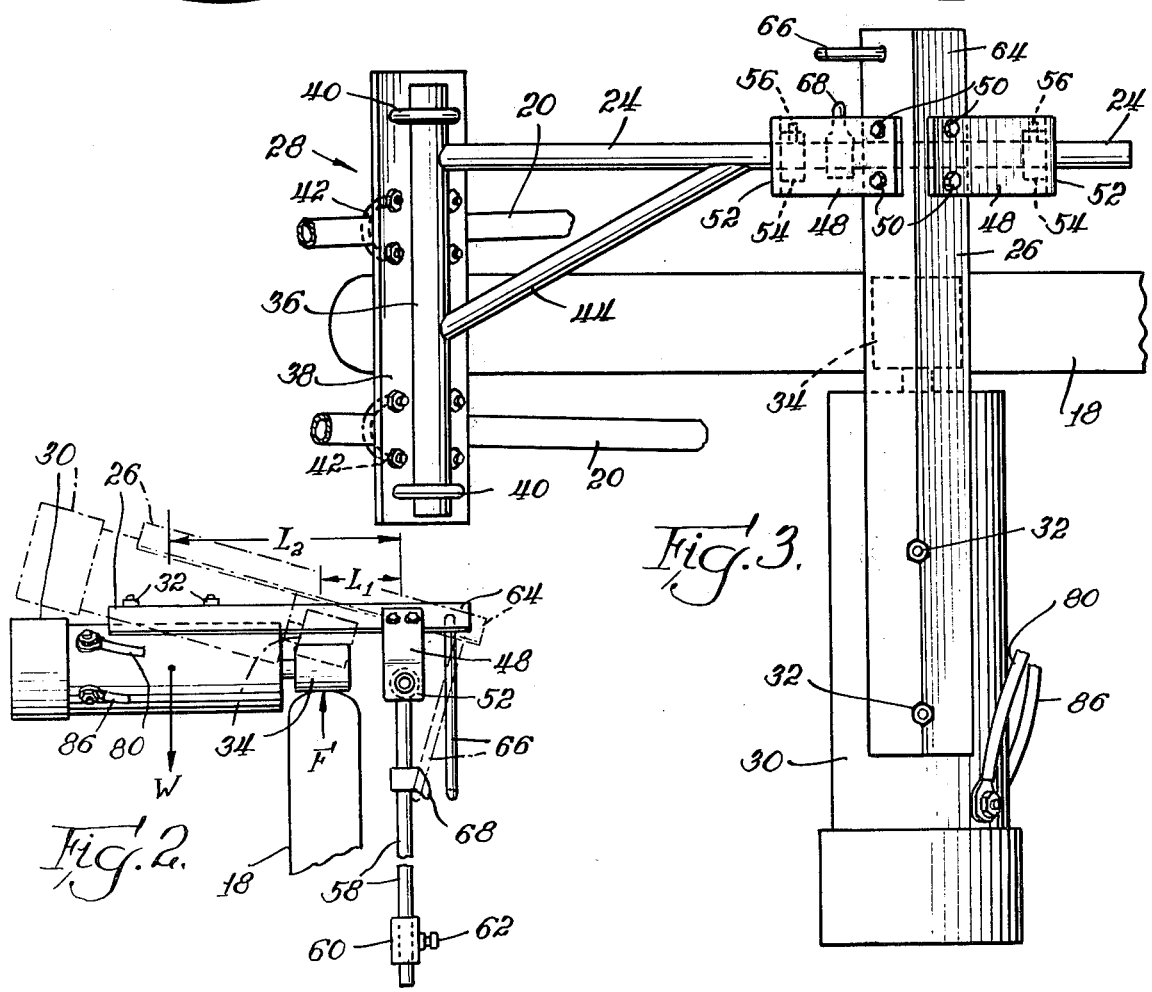

AUXILIARY UNIT FOR DRIVING A BICYCLE

SUMMARY OF THE INVENTION

The Background

This invention relates to an electrically operated auxiliary unit for driving a light-weight cycle, and more particularly to an auxiliary unit whose entire driving engagement with the driven wheel of the cycle is created by the weight of the motor of the unit brought to bear near the end of a lever arm which is pivotally supported by the frame of the unit.

Auxiliary devices for driving relatively light-weight cycles, such as the common bicycle, have been in existence for some time. For example, U.S. Pat. No. 3,905,442 describes an electrically driven unit for propelling a bicycle by a motor and a friction wheel located above the front wheel of the bicycle. By means of a lever attached to the handlebars of the bicycle, the rider can alternately lower the friction wheel into engagement with the front wheel of the bicycle, or raise the friction wheel out of engagement.

A substantial disadvantage of U.S. Pat. No. 3,905,442 and other prior art of which the applicant is aware is the complexity of the driving unit due to the necessity of springs or other devices required to maintain the friction wheel in driving engagement with the wheel of the bicycle since normally the weight of the driving unit is insufficient to create the necessary driving engagement between the friction wheel and the wheel of the bicycle. Furthermore, without such springs, the driving unit itself must be quite heavy in order to create sufficient engagement force between the friction wheel of the unit and the wheel of the cycle being driven. Accordingly, the driving unit is often far too massive and therefore unfeasible for addition to the relatively light-weight bicycle. Another disadvantage of this system is the requirement that the wheel be exactly round in order for the system to work properly.

The Invention

The foregoing disadvantages of the prior art are overcome by the present invention which provides a frame including a lever system for supporting what may be a relatively lightweight drive motor and bringing the weight of the motor to bear in maintaining driving engagement with the rear wheel of the bicycle. The unit is comprised of a motor support frame having an elongated, horizontal bar located at the top and at one side of the rear wheel of the bicycle and securely attached to the cycle frame. A generally horizontal arm extends transversely over the wheel substantially perpendicular to the horizontal bar and is pivotally attached to the horizontal bar. A motor is mounted on the horizontal arm and located such that the center of gravity of the motor is positioned on the opposite side of the rear wheel from the location of the horizontal bar. A drive pulley is attached to the motor and positioned above the wheel in order to engage the top of the wheel.

In one embodiment of the invention, the horizontal bar is attached to the rear fork of the frame of the bicycle. A clamping bracket is welded or otherwise affixed to the horizontal bar, and the clamping bracket itself is attached to the rear fork. Preferably, individual bolts are used to clamp the bracket to each of the two members of the fork.

The horizontal arm is pivotally attached to the horizontal bar by means of a pivotal bracket assembly mounted on the horizontal bar. The bracket assembly can be affixed at any location on the horizontal bar in order to effect proper location of the motor for driving the rear wheel.

As additional support for the auxiliary unit, a vertical support shaft may be located beneath and connected to the horizontal bar at an appropriate location. It is preferred that the vertical support shaft is attached to the frame of the bicycle adjacent the wheel to which it is proximate.

Included in combination with the vertical support shaft is a hook used to hold the drive pulley out of driving engagement with the wheel when such disengagement is desired. The horizontal arm is extended in a direction away from the wheel, and an engagement shaft extends downwardly from the extension, engageable with the hook when the horizontal arm, with motor and pulley attached thereto, is lifted out of driving relationship with the wheel of the cycle.

Various other features and advantages of the invention will become apparent in the following drawing and detailed description of the invention.

BRIEF DESCRIPTION OF THE DRAWING

The invention is shown in detail in the drawing, in which:

FIG. 1 is an elevational illustration of a bicycle having mounted thereon the auxiliary unit of the invention;

FIG. 2 is a detail view, in elevation, of the auxiliary unit looking along the lines 2—2 of FIG. 1; and FIG. 3 is a top plan view of the auxiliary unit looking along lines 3—3 of FIG. 1.

DETAILED DESCRIPTION OF THE INVENTION

The invention is described and illustrated having the auxiliary unit mounted for driving the rear wheel of a bicycle. Alternatively, with appropriate alteration of the mounting bracket structure, the unit could be mounted to drive the front wheel of the bicycle. Also, the unit could be adapted to drive one wheel of any other type of velocipede, such as a tricycle. The embodiment described is intended to be illustrative of the utilization of the invention.

A bicycle having mounted thereon the apparatus of the invention is illustrated at 10 in FIG. 1. The bicycle 10 includes a frame 12, a front wheel 14 mounted in a front fork 16 of the frame 12, and a rear wheel 18 mounted in a rear fork 20 of the frame 12.

Mounted on the frame 12 of the bicycle and above the rear wheel 18 is the auxiliary unit 22 of the invention. The auxiliary unit includes as major components a motor support frame including an elongated, horizontal bar 24, a horizontal arm 26 extending perpendicular to the horizontal bar 24 over the wheel 18, and a bracket assembly 28. A motor 30 is bolted to the under side of horizontal arm 26 by a pair of bolts 32 as shown. The motor 30 is provided driving engagement with the wheel 18 by means of a drive pulley 34. To utilize the advantage of its weight, the motor 30 is located outboard from the drive pulley 34.

The horizontal bar 24 is constructed of a metallic tube or shaft, as shown. The bar 24 is of a sufficient length to allow mounting of the horizontal arm 26 thereupon, and positioning of the arm 26 such that the pulley 34 is located in driving relationship to the wheel 18 at or near the top thereof.

In the particular form of the bracket assembly 28 shown in the drawing, the horizontal bar 24 is attached to a transverse bar 36. The bar 36 in turn is attached to a flat plate 38 by means of a pair of U-bolts 40. The plate 38 is attached to the rear fork 20 by additional U-bolts 42. The structure of the bracket assembly 28 may be altered depending on the type of bicycle frame to which the unit 22 is to be attached.

The U-bolts 42 are readily releasable by a wrench, allowing one to position the plate 38 at a predetermined and desired location along the rear fork 20. In the same manner, the U-bolts 40 are readily releasable, allowing the rotative position of the transverse bar 36 to be altered, thereby raising or lowering the horizontal bar 24.

For additional stabilizing between the horizontal bar 24 and the bracket assembly 28, a lateral brace 44 may be used. Preferably, the brace 44 is welded to both the bar 36 and the horizontal bar 24. Likewise, for maximum strength, the horizontal bar 24 is preferably welded to the bar 36.

The horizontal arm 26 is shown as an inverted V-shaped angle bar in the drawing. It is attached to the horizontal bar 24 by means of a pivotal bracket 46. The bracket 46 includes complementary mounting arms 48 attached to the horizontal arm 26 by a plurality of bolts 50. Each of the mounting arms 48 has a vertical portion 52 disposed about the horizontal bar 24.

A pair of bushings 54 are arranged on bar 24 to serve as stops for locating the motor bracket assembly 46 at the desired location on the supporting bar. When the assembly is in the correct position for driving the bicycle wheel, preferably just to the rear of the top of the wheel as shown in FIG. 1, set screws 56 are tightened to retain the unit in this position. With this arrangement, the bracket 46 is free to pivot about bar 24 to accommodate the drive engagement with the wheel to any disturbing irregularities in the wheel or tire or bumps on the surface over which the bicycle is being ridden. Thus, the driving pressure is continuously maintained by gravity.

An additional vertical support for the auxiliary unit may be provided to maintain the horizontal bar 24 rigidly in place. As best shown in FIG. 2, a vertical support shaft 58 is located beneath and connected to the horizontal bar 24. The shaft 58 passes through an attachment device 60 which may be affixed to the bicycle frame at the axle of the wheel 18. The device 60 includes an adjustment nut 62 to provide for vertical adjustment of the position of the shaft 58.

In order to maintain the drive pulley 34 out of driving relationship with the wheel 18 when the auxiliary unit 22 is not in use, the horizontal arm 26 includes an integral extension 64 protruding beyond the point of attachment of the pivotal bracket 46. An engagement shaft 66 extends downwardly from the extension and is engageable with a hook 68 affixed to the support shaft 58. As shown in broken lines in FIG. 2, when one desires disengagement of the auxiliary unit from the wheel 18, one raises the motor 30 by pivoting it, with the horizontal arm 26, about the horizontal bar 24. The engagement shaft 66 is then inserted beneath the hook 68 to retain the auxiliary unit in the disengaged position shown in broken lines.

Electrical energy is provided for the motor 30 by a storage battery 70. The battery is seated on a support 72 which is affixed to the frame 12 of the bicycle by means of attachment brackets 74. A brace 76, also attached to the frame 12, assists in maintaining the battery 70 in its proper location.

Wires are attached to the terminals 78 of the battery 70 for providing electrical energy to the motor 30. A first wire 80 leads from the left terminal 78 (FIG. 1) to a switch 82 located on the handlebars of the bicycle 10. The wire 80 then continues from the switch 82 to the motor 30. A second wire 86 extends from the right terminal 78 directly to the motor 30. As is well known, the wires 80 and 82 are attached to the motor 30 in a particular relationship depending on the polarity of the terminals 78 so that the pulley 34 may be driven in a clockwise direction (FIG. 1) in order to drive the wheel 18 in a counterclockwise direction.

A substantial advantage of the invention is location of the motor such that a lever arm is created along the horizontal arm 26. Looking to FIG. 2, if W is the weight of the motor 30, F is the normal force of the pulley against the wheel 18, $L_1$ is the distance between the member 24 and the point of application of F, and $L_2$ is the distance between the member 24 and the center of gravity of the motor 30 (represented by the weight W), then:

$$F = (L_2/L_1) W$$

Hence, by proper adjustment of the ratio $L_2/L_1$, the force F can be selected for a given weight W so that the motor 30 can deliver its full rated torque through the pulley 34 to the wheel 18 without slippage. A relatively light-weight motor can be used if the ratio $L_2/L_1$ is sufficiently large.

After the auxiliary unit 22 is mounted upon the cycle, to ride the cycle with the auxiliary unit installed thereon, the operator mounts in the normal manner and pedals the cycle manually to initiate movement. The operator then closes the switch 82, activating the motor 30 to drive the wheel 18 through the pulley 34. When the operator desires to slow or stop the cycle, the switch 82 may be opened to disconnect the driving force from the wheel 18 and the brakes applied as needed.

Should the operator find it necessary or desirable to ride the cycle under manual power, the auxiliary unit 22 may be disengaged from the wheel 18 by lifting the motor 30 and slipping the engagement shaft 66 beneath the hook 68. If desired for any reason, the operator may also lift the motor further than the position illustrated in broken lines in FIG. 2, moving it to and even beyond the vertical position.

Various changes may be made to the invention and arrangement of the components of the invention to adapt the drive unit to varying sizes and shapes of bicycle frames without departing from the spirit thereof or scope of the following claims.

I claim:

1. An electrically operated auxiliary unit for driving a light-weight cycle and constructed to be mounted upon the cycle frame, comprising
   a motor support frame having an elongated, horizontal bar longitudinally oriented and located at one side and near the top of a wheel of the cycle,
   means for mounting said horizontal bar on the cycle frame,
   a generally horizontal arm pivotally mounted at one end of said horizontal bar and extending transversely over the wheel of the cycle, motor means secured to said horizontal arm near the distal end thereof whereby the center of gravity of said motor means is located on the opposite side of the wheel from the location of said horizontal bar, and a drive pulley attached to said motor means and positioned to engage the top of the wheel of the cycle.

2. An auxiliary unit according to claim 1 in which said means for mounting said horizontal bar to the cycle frame comprises a clamping bracket for attachment to a fork of the cycle.

3. An auxiliary unit according to claim 2 including individual bolting means attached to said clamping bracket for attaching said clamping bracket to each of the fork members of the fork of the cycle.

4. An auxiliary unit according to claim 1 including a pivotal bracket attached to said horizontal arm and mounted on said horizontal bar for pivotally mounting said horizontal arm on said horizontal bar.

5. An auxiliary unit according to claim 4 in which said pivotal bracket is slidably mounted on said horizontal bar.

6. An auxiliary unit according to claim 1 including a vertical support shaft located beneath and connected to said horizontal bar.

7. An auxiliary unit according to claim 6 including means to maintain said drive pulley out of driving engagement with the wheel of the cycle.

8. An auxiliary unit according to claim 7 in which said means to maintain comprises a hook attached to said vertical support shaft, an extension of said horizontal arm directed away from the cycle wheel, and an engagement shaft extending downwardly from said extension.

9. An auxiliary unit according to claim 1 in which said motor means is located outboard of said drive pulley along said horizontal arm.

10. An electrically operated unit for driving a bicycle and constructed to be mounted upon the frame of the bicycle, comprising a motor support frame including a horizontal bar longitudinally oriented and located at one side and near the top of the rear wheel of the bicycle, a clamping bracket attached to said horizontal bar, said clamping bracket being adjustably secured to the rear fork of the bicycle whereby the position of said bar with respect to said wheel may be adjusted, a generally horizontal arm extending transversely over the rear wheel of the bicycle, a pivotal bracket attached to said horizontal arm and pivotally mounted on said horizontal bar, an electric motor secured to said horizontal arm near the distal end thereof with the center of gravity of the motor being located on the opposite side of said rear wheel from the location of the horizontal bar, and said motor having a drive pulley oriented inboard of said motor and positioned to engage the top of the rear wheel of the bicycle.

* * * * *